US012319554B2

(12) United States Patent
Brown

(10) Patent No.: US 12,319,554 B2
(45) Date of Patent: Jun. 3, 2025

(54) DUAL-PURPOSE CROWN CAP-REMOVING AND JEWELRY DEVICE

(71) Applicant: Jade M Brown, Charleston, SC (US)

(72) Inventor: Jade M Brown, Charleston, SC (US)

( * ) Notice: Subject to any disclaimer, the term of this patent is extended or adjusted under 35 U.S.C. 154(b) by 41 days.

(21) Appl. No.: 18/189,098

(22) Filed: Mar. 23, 2023

(65) Prior Publication Data

US 2023/0303376 A1 Sep. 28, 2023

Related U.S. Application Data

(60) Provisional application No. 63/323,108, filed on Mar. 24, 2022.

(51) Int. Cl.
*B67B 7/16* (2006.01)

(52) U.S. Cl.
CPC .................................... *B67B 7/16* (2013.01)

(58) Field of Classification Search
CPC ................................ B67B 7/16; A44B 15/007
See application file for complete search history.

(56) References Cited

U.S. PATENT DOCUMENTS

| | | | | |
|---|---|---|---|---|
| 1,500,881 | A * | 7/1924 | Moriarty | B67B 7/16 81/3.27 |
| 8,162,276 | B2 | 4/2012 | Fathi et al. | |
| 2007/0256521 | A1* | 11/2007 | Rebordinos Villalba | B67B 7/16 81/3.31 |
| 2010/0078541 | A1* | 4/2010 | Fathi | B67B 7/16 248/339 |
| 2013/0277524 | A1* | 10/2013 | Fathi | F16B 45/022 248/308 |
| 2013/0333427 | A1 | 12/2013 | Guerrini | |
| 2015/0266710 | A1* | 9/2015 | Camp | B67B 7/16 81/3.55 |

* cited by examiner

*Primary Examiner* — Anna K Kinsaul
*Assistant Examiner* — Nicholas E Igbokwe
(74) *Attorney, Agent, or Firm* — Sagacity Legal PLLC

(57) ABSTRACT

A serviceable crown cap-removing device to remove a crown cap from a bottle is described. The device includes a first elongated component, a second elongated component, a notch, a first connector removably connecting the first elongated component to the second elongated component, and a second connector movably engaging the first elongated component with the second elongated component, where a user can operate the device by holding the second elongated component thus allowing the first elongated component to be contacted with the crown cap from the bottle.

18 Claims, 6 Drawing Sheets

DUAL-PURPOSE CROWN CAP-REMOVING AND JEWELRY DEVICE

CROSS-REFERENCE TO RELATED APPLICATIONS

The present application is related to and claims benefit under 35 U.S.C. § 119(e) from U.S. Provisional Patent Application Ser. No. 63/323,108 and contain at least a claim to a claimed invention that has an effective filing date as defined in 35 U.S.C 100(i) that is on or after Mar. 16, 2013, the following U.S. application commonly owned with this application by Jade Brown: Ser. No. 63/323,108 filed on Mar. 24, 2022, titled "A wearable bottle opener," the entire contents of which being incorporated herein by reference.

BACKGROUND OF THE INVENTION

It is a common practice to use crown cap removers to remove bottle caps (for example, beer and soda bottles, etc.), where the crown cap removers are formed as a closed loop and especially a single closed loop that goes around a rim of the crown cap, thus removing the cap once a user applies pressure with a lever action to take the crown cap off the bottle. Such crown cap removers require excessive force from the user while opening and can be a safety hazard if not used properly. These cap removers are typically made of metal and are relatively large and heavy, making them difficult to fit in a pocket or bag. This can be especially problematic for people who enjoy bottled beverages while traveling or participating in outdoor activities, as they may need more accessible access to a crown cap remover when needed. As a result, they may have difficulty opening their drinks or be forced to use hazardous methods to open the cap.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification and serve to illustrate further embodiments of concepts that include the claimed invention and explain various principles and advantages of those embodiments.

Figure 1:
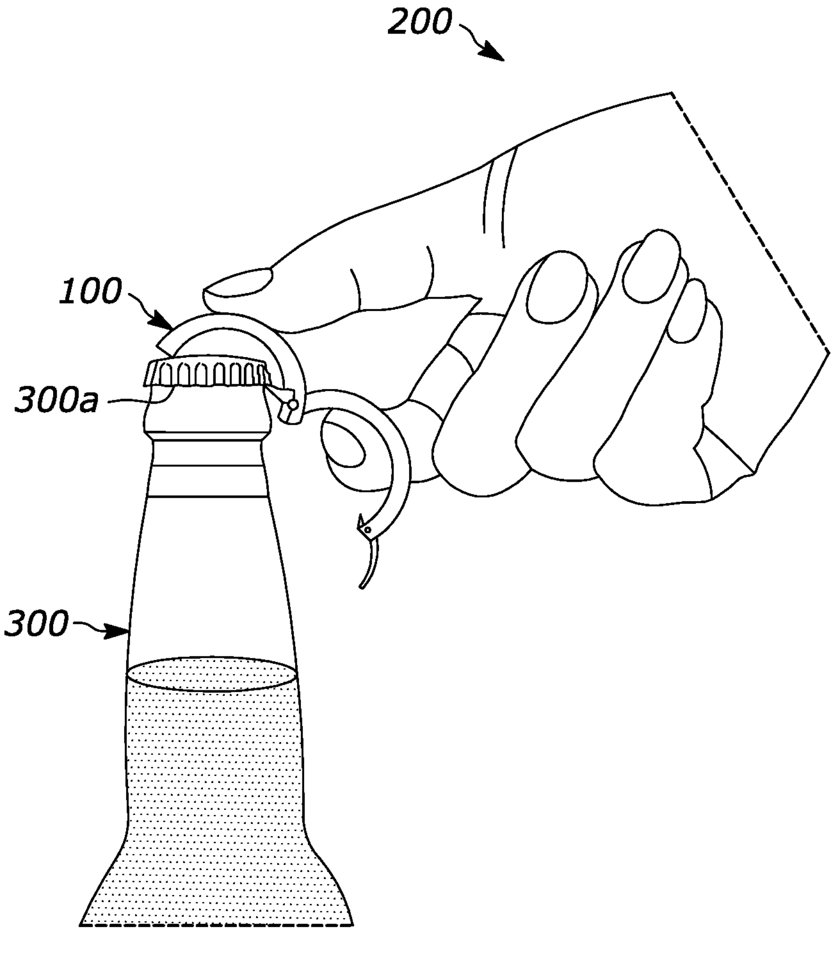
FIG. 1 is a pictorial view illustrating an exemplary application of a serviceable crown cap-removing device in accordance with some embodiments.
Figure 2:
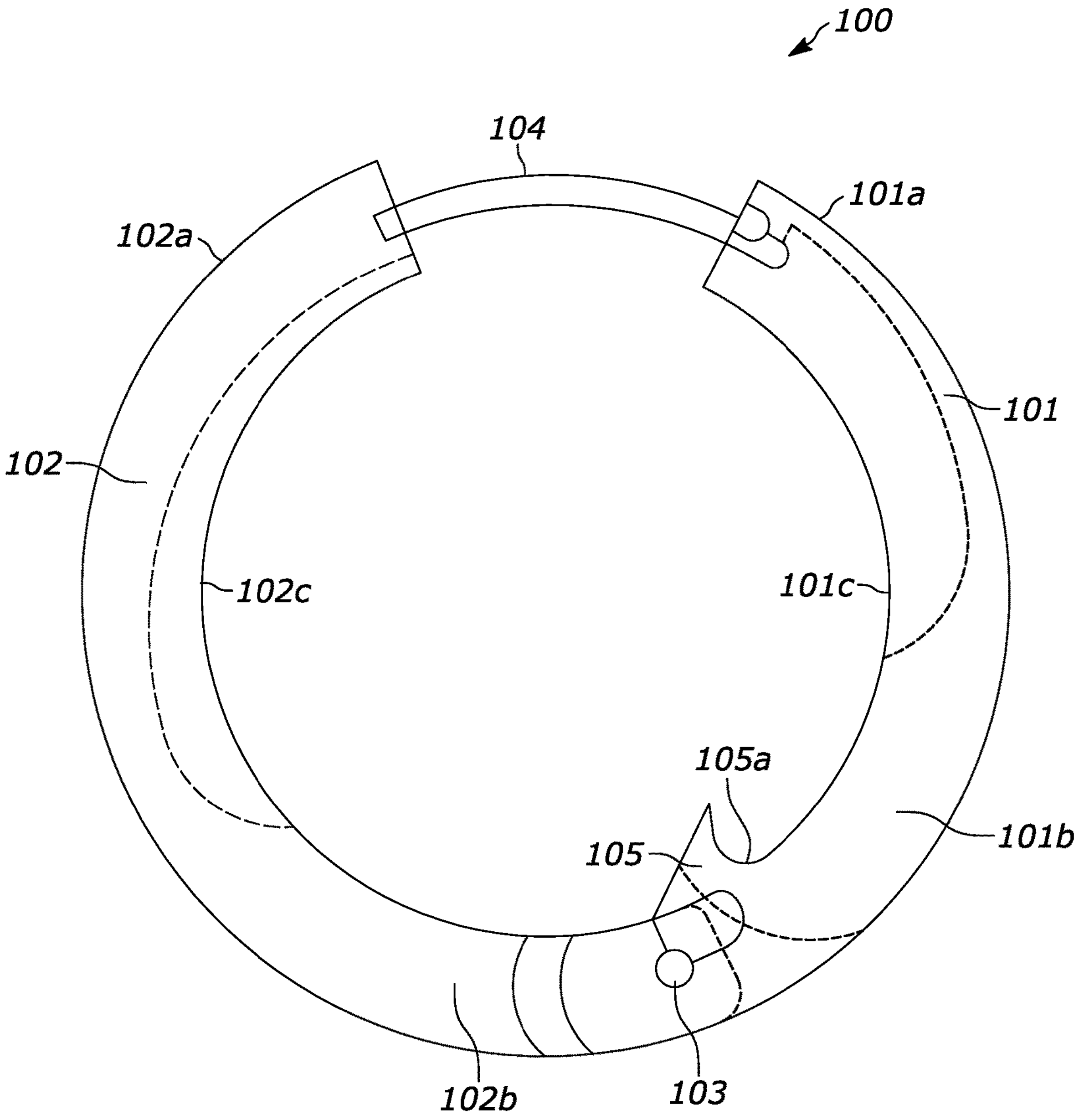
FIG. 2 is a close-up view of the serviceable crown cap-removing device of FIG. 1, illustrating exemplary structural and configurational details of the said serviceable crown cap-removing device in accordance with some embodiments.

Skilled artisans will appreciate those elements in the figures illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the description with details that will be readily apparent to those of ordinary skill in the art having the benefit of the description herein.

DETAILED DESCRIPTION OF THE INVENTION

The embodiments described herein are related to a serviceable crown cap removing device and method of operating the same, and, in particular, to a serviceable crown cap removing device that assists in the opening a crown cap of a bottle and also can be used as a wearable piece like jewelry.

In one aspect, a dual purpose crown cap-removing and jewelry device is described. The device include a first elongated component having a top end, a bottom end, an inner perimeter, and an outer perimeter. The device include a second elongated component having a top end, a bottom end, an inner perimeter, and an outer perimeter. The device may furthermore comprise a first element mechanically attached at the bottom end of the first elongated component to form an indentation, configured to be inserted at a knurled rim of a crown cap of a bottle and angularly situated with the inner perimeter of the first elongated component. The device, in addition, includes a first connector removably connecting the top end of the first elongated component to the top end of the second elongated component. The device further includes a second connector mechanically engaging the bottom end of the first elongated component and the first element with the bottom end of the second elongated component, where the first and the second elongated components are mirror-image halves configured to form an enclosed shape for wearing as a piece of jewelry and an open shape for removing the crown cap of the bottle. The first and second connectors act as a joint between the first and the second elongated components with at least opposed by 180 degrees.

In another aspect, a method for removing a crown cap from a bottle using a dual purpose crown cap-removing and wearing it as a jewelry device is described. The method includes disconnecting a first connector to open a first elongated component and a second elongated component of the device and placing a top end of the first elongated component of the device on the crown cap of the bottle. The method further includes inserting a first element of the first elongated component on a knurled rim of the crown cap and holding the second elongated component of the device, thereby actuating the knurled rim of the crown cap to remove the crown cap from the bottle and further opening the bottle. The method further includes connecting the first connector to enclose the first elongated component and the second elongated component of the device to form a piece of jewelry. The serviceable crown cap-removing device further includes a first elongated component having a top end, a bottom end, an inner perimeter, and an outer perimeter, and a second elongated component having a top end, a bottom end, an inner perimeter, and an outer perimeter. The first element is mechanically attached at a bottom end of the first elongated component to form an indentation and configured to be angularly situated with the inner perimeter of the first elongated component.

The method further includes retaining the knurled rim of the crown cap inside the first element of the first elongated component, wherein the first elongated component further includes an outer perimeter. The method further includes holding the second elongated component of the device, where the second elongated component further includes a top-end, a bottom-end, an inner perimeter, and an outer perimeter to facilitate the opening of the device; connecting the first connector by connecting the top end of the first elongated component to the top end of the second elongated component; and mechanically engaging the bottom end of the first elongated component and the first element with the bottom end of the second elongated component using a second connector. The first and the second elongated components are mirror-image halves configured to form an enclosed shape for wearing as a piece of jewelry and an open shape for removing the crown cap of the bottle. The dual purpose crown cap-removing and jewelry device is designed to remove crown caps secured on bottles used for drinks like beer, soda, and the like. The dual purpose crown cap-removing and jewelry device can additionally be used as a solid jewelry piece, a keychain piece, a hair accessory, a finger stand, and the like. The term "dual purpose" refers to a device that can be used for two different purposes. The term "open shape" can relate to a shape that does not have all its sides connected end-to-end, resulting in a figure with one or more openings or gaps.

Reference will now be made in detail to specific embodiments or features, examples of which are illustrated in the accompanying drawings. Generally, corresponding reference numbers may be used throughout the drawings to refer to the same or corresponding parts; for example, 100, 101, and 201 could refer to one or more comparable components used in the same and/or different depicted embodiments.

Referring to FIG. 1, a pictorial view of an exemplary application of a serviceable crown cap-removing device 100 in accordance with some embodiments is illustrated and described. The serviceable crown cap-removing device 100 is used by a user 200 to remove a crown cap 300*a* secured on a bottle 300. The term "remove" when used concerning the crown cap 300*a* secured on a bottle 300 shall be understood as the opening of the bottle, thereby removing the crown cap 300*a*. The term "serviceable," when used concerning the crown cap-removing device 100, shall be understood as multipurpose or used for various services and utilities. Many applications of the serviceable crown cap-removing device 100, such as depicted in FIG. 1, can be contemplated and described in FIG. 1 as solely exemplary.

In FIG. 1, for example, the serviceable crown cap-removing device 100 is applied to the crown cap 300*a* of a bottle 300. For example, the bottle 300 is a beverage bottle, such as a soda bottle. As shown in FIG. 1, the serviceable crown cap-removing device 100 is partially placed over the crown cap 300*a* and partially held by the user 200 to remove the crown cap 300*a* from the bottle 300. The term "crown cap" refers to the type of bottle cap made by pressing a circular piece of metal around the top of the bottle.

Figure 3:
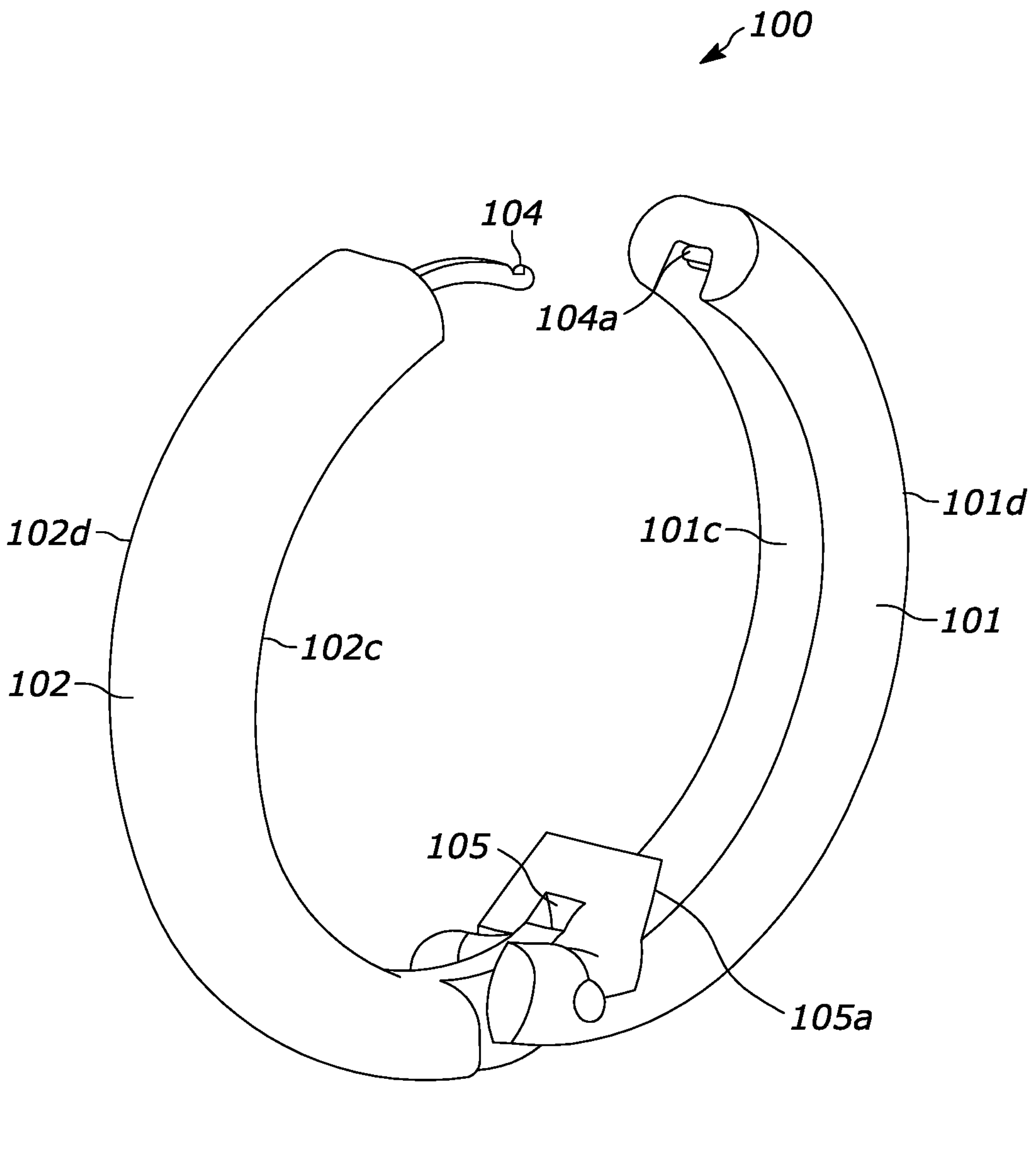
FIG. 3 is a close-up view of the serviceable crown cap-removing device of FIG. 1, illustrating exemplary structural and configurational details of the said serviceable crown cap-removing device in accordance with some embodiments.
Figure 4:
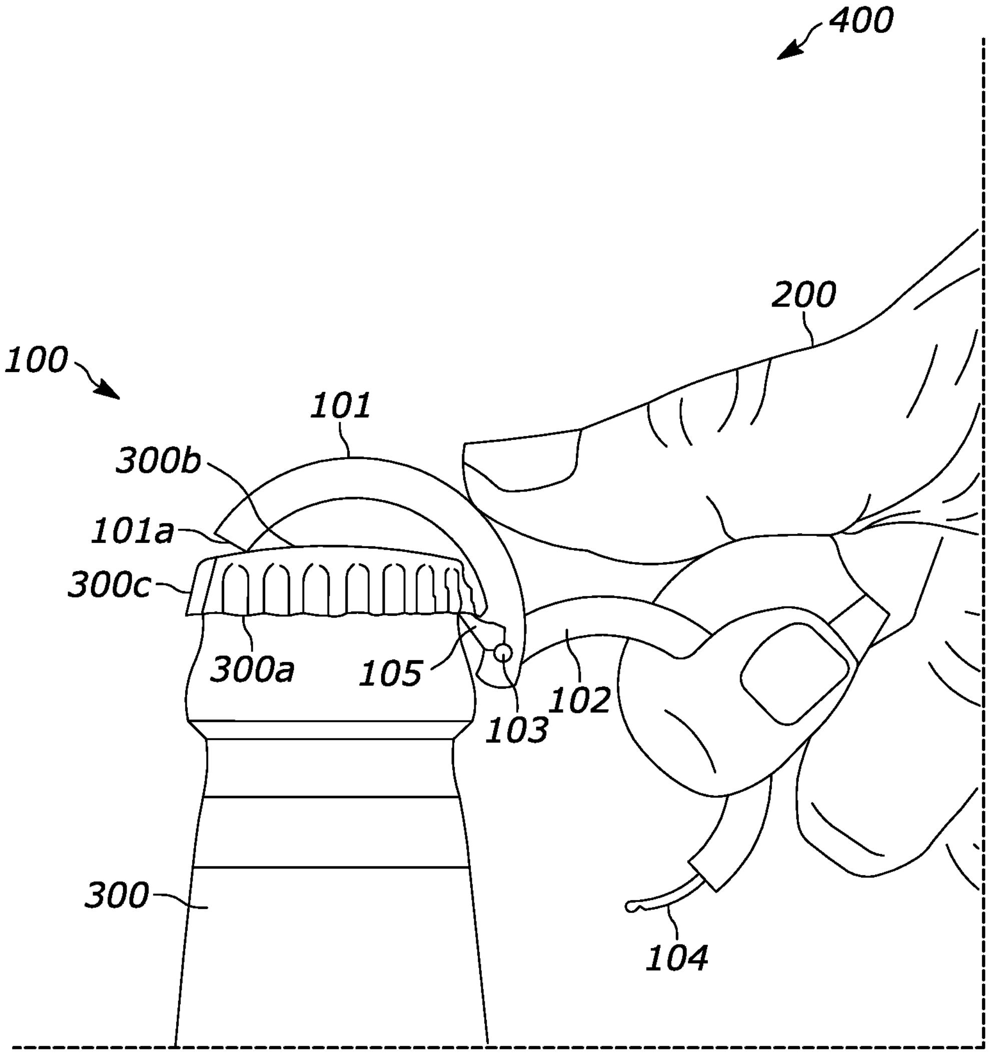
FIG. 4 is a close-up view illustrating an exemplary application of the said serviceable crown cap-removing device of FIG. 1, in accordance with some embodiments.
Figure 5:
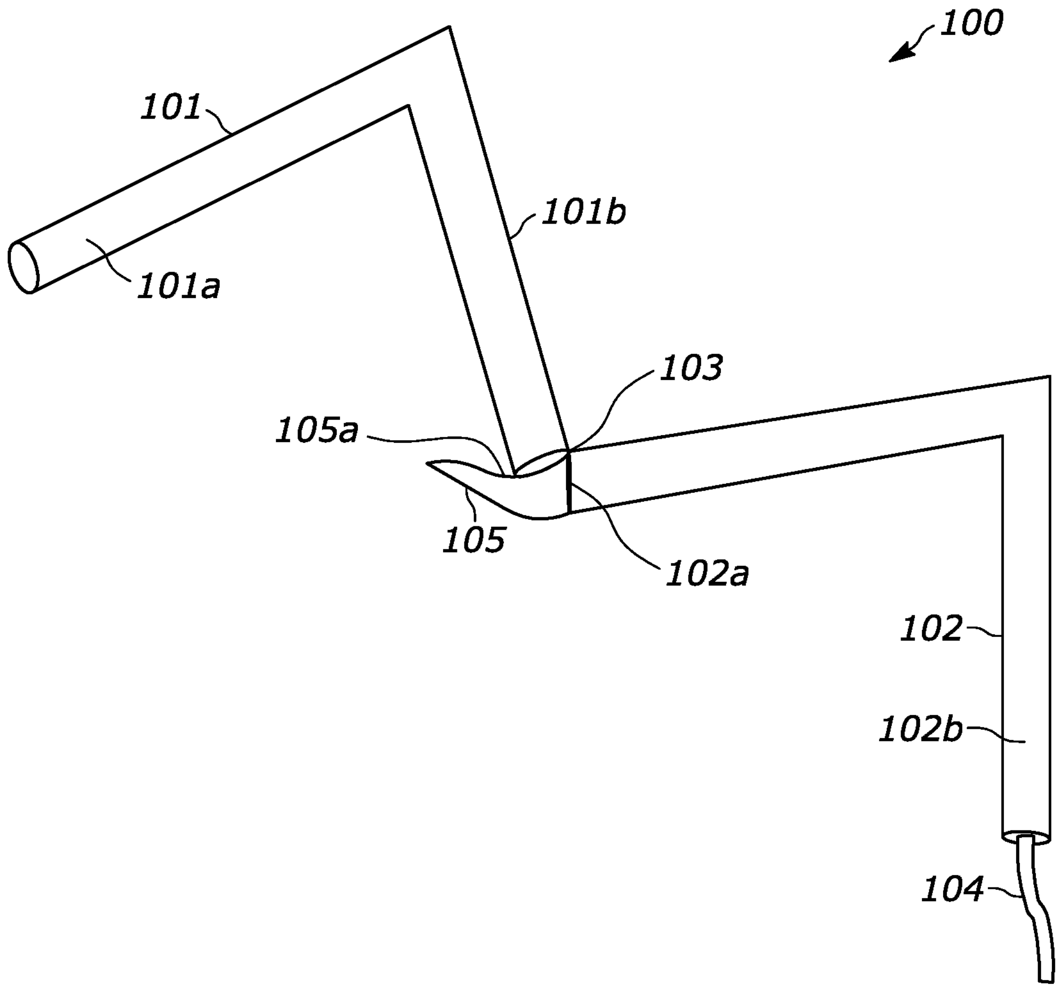
FIG. 5 is a pictorial view of an exemplary illustration of said serviceable crown cap-removing device of FIG. 1, in accordance with some embodiments.

Referring to FIGS. 3 and 4, and also in conjunction with FIG. 5, the serviceable crown cap-removing device 100 is described. The serviceable crown cap-removing devices further include a first elongated component, 101, and a second elongated component, 102. The first elongated component 101 further includes a top end 101*a*, a bottom end 101*b*, an inner perimeter 101*c*, and an outer perimeter 101*d*. The second elongated component 102 further includes a top-end 102*a*, a bottom-end 102*b*, an inner perimeter 102*c*, and an outer perimeter 102*d*.

The first and the second elongated components 101,102 are of a shape including but not limited to a half heart-shaped, a half loop, a half square, a half triangle, a half polygonal, and a half diamond, mirror-image halves designed to form the enclosed shape. The enclosed shape can consist of a heart shape, a circle, a square, a diamond, a triangle, a diamond, and a polygonal shape.

The device may 100 furthermore include a first element 105 mechanically attached at the bottom end 101 *b* of the first elongated component 101 to form an indentation, configured to be inserted at a knurled rim of a crown cap of a bottle. The first element 105 is configured to be angularly situated with the inner perimeter 101 *c* of the first elongated component 101, thereby forming an indentation 105 *a*. The indentation 105 *a* is configured to open or remove the crown cap 300 *a* of bottle 300. The term "angularly situated" refers to an element placed in a non-parallel or non-perpendicular orientation. The term "mechanically attached" refers to a separate element mechanically attached to another element.

The device 100 in addition, includes a first connector 104 removably connecting the top end 101*a* of the first elongated component 101 to the top end 102*a* of the second elongated component 102. The device furthermore includes a second connector 103 movably engaging the bottom end 101*b* of the first elongated component 101 to the bottom end 102*a* of the second elongated component 102, where the first and the second elongated components 101,102 are mirror-image halves designed to form an enclosed shape. The term 'enclosed shape' can relate to a shape enclosed from all the sides end-to-end and form a figure with no openings is called a closed shape. The enclosed shape is configured to be used as a solid jewelry piece, a keychain piece, a hair accessory, and a finger stand apart from being used as the crown cap opening device. The serviceable crown cap removing device 100 wherein the first and the second elongated components 101, 102 are constructed from a plastic, a metal, and an alloy material.

The first connector 104 removably connects the top end 101*a* of the first elongated component 101 to the top end 102*a* of the second elongated component 102 in confronting relationship, thereby forming the enclosed shape as described above. The first connector 104 may be selected from a group consisting of a spring connector, a magnetic connector, a press fit, a hinge and pin connector, and a tactile click connector. The first connector 104 is designed to be constructed from a metal and an alloy material.

The second connector 103 movably engages the bottom end 101*b* of the first elongated component 101 with the bottom end 102*b* of the second elongated component, thereby opening and forming the enclosed shape. The second connector 103 may be selected from a group consisting of a spring connector, a hook connector, a clasp, a clip, a buckle, a hinge and pin connector, a hoop, and a hasp. The second connector 103 is designed to be constructed from a metal and an alloy material. The serviceable crown cap-removing device 100 includes at least one first connector 104 and second connector 103 for working the serviceable crown cap-removing device. The first and second connectors act as a joint between the first and the second elongated components with at least being opposed by 180 degrees.

Referring to the FIG. 4, which is a close-up view illustrating an exemplary application of the serviceable crown cap-removing device 100 of FIG. 1, in accordance with some embodiments. As illustrated, the serviceable crown cap-removing device 100 is configured to remove the crown cap 300*a* of the bottle 300. The crown cap 300*a* further includes a knurled rim 300*c* and a top flat surface 300*b*. The top end 101*a* of the first elongated component 101 is designed to be placed on the top flat surface 300*b* of the crown cap 300*a*, where the first elongated component 101 creates two points of contact between the first elongated component 101 and the crown cap 300*a*. The first point of contact is contact between the first elongated component 101 with the top flat surface 300*b*, whereas the second point of contact is contact between the notch 105 of the first elongated component 101 with the knurled rim 300*c*. During the second point of contact, the knurled rim 300*c* is designed to be retained inside the indentation 105*a* (not illustrated) to create a grip to further remove the crown cap 300*a* from the bottle 300.

The user 200 is configured to insert the notch 105 at the knurled rim 300*c* of the crown cap 300 to initiate the second point of contact, whereas at the same time or alternatively the user 200 initiates the first point of contact by retaining the first elongated component 101 on the top flat surface 300*b*. During the second point of contact the knurled rim 300*c* is designed to be retained inside the indentation 105*a* (not illustrated) to create a grip to further remove the crown cap 300*a* from the bottle 300. The user 200 further operates the second elongated component 102 by holding the second elongated component 102 to further actuate the knurled rim 300*c* of the crown cap 300*a* to open the crown cap 300*a* from the bottle 300. In the operation 606, the user 200 opens the bottle 300 by removing the crown cap 300*a*.

FIG. 5 is a pictorial view of another exemplary illustration of said serviceable crown cap-removing device of FIG. 1, in accordance with some embodiments. As illustrated, the serviceable crown cap-removing device 100 further includes a first elongated component 101 and a second elongated component 102. The first elongated component, 101, further comprises a top end 101*a*, a bottom end 101*b*, an inner perimeter 101*c*, and an outer perimeter 101*d*. The second elongated component 102 further includes a top-end 102*a*, a bottom-end 102*b*, an inner perimeter 102*c*, and an outer perimeter 102*d*.

The device may 100 furthermore include a notch 105 mechanically attached at the bottom end 101*b* of the first elongated component 101. The device 100 also includes a first connector 104, removably connecting the top end 101*a* of the first elongated component 101 to the top end 102*a* of the second elongated component 102. The device furthermore includes a second connector 103 movably engaging the bottom end 101*b* of the first elongated component 101 to the bottom end 102*a* of the second elongated component 102, where the first and the second elongated components 101,102 are mirror-image halves designed to form an enclosed shape. Many applications of the serviceable crown cap-removing device 100, such as in FIG. 5, can be contemplated and, as described in FIG. 5, solely exemplary.

Figure 6:
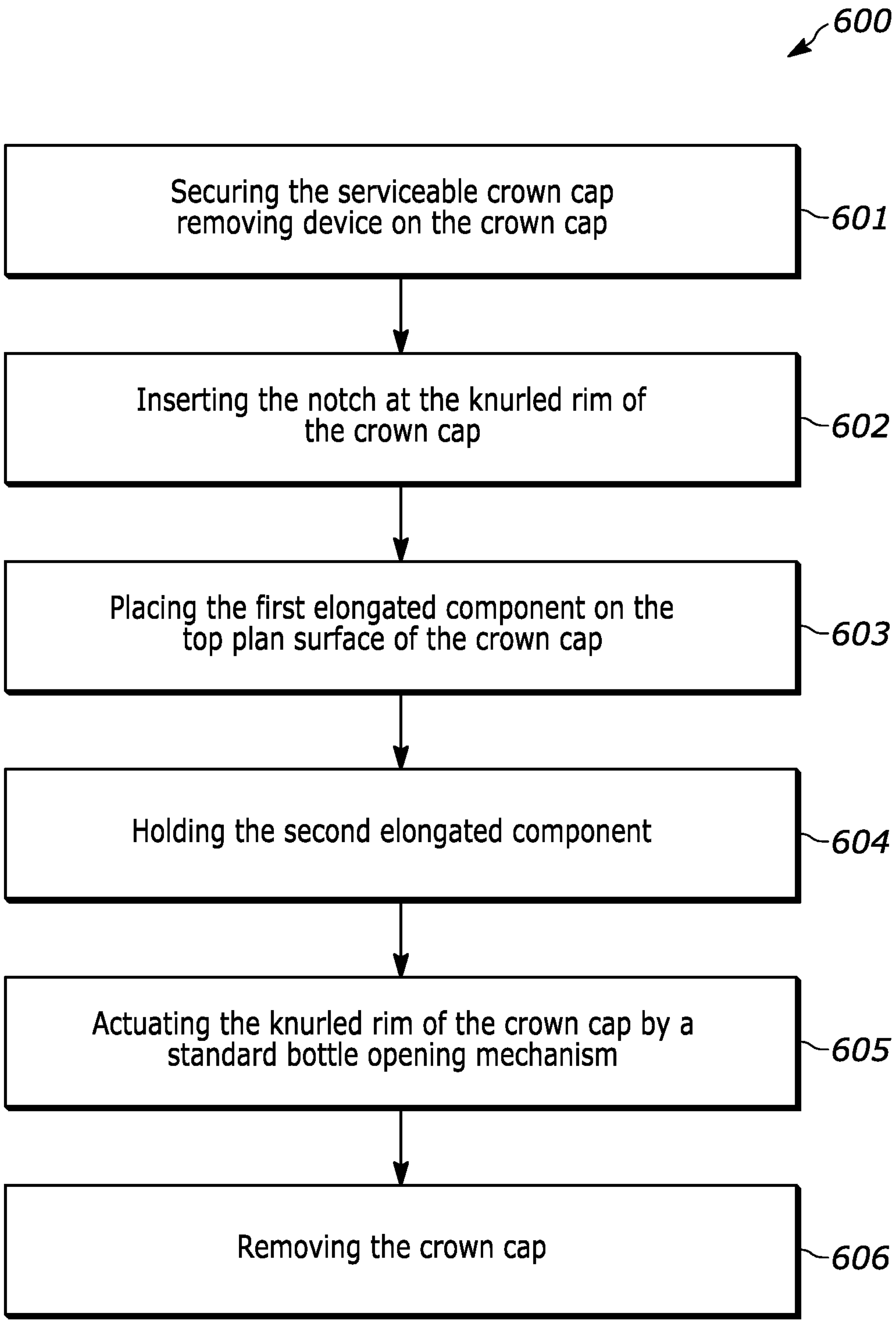
FIG. 6 is a flowchart illustrating a method of operating said serviceable crown cap-removing device of FIG. 1, in accordance with some embodiments.

Referring to FIG. 6, illustrating a method 600 for operating the serviceable crown cap-removing device 100 of FIG. 1, in accordance with some embodiments. The method of removing the serviceable crown cap-removing device 100 by the user 200 will be described herein concerning the FIG. 4 and FIG. 6. As illustrated, beginning with operation 601, where the user 200 (as illustrated in FIG. 4) secures serviceable crown cap-removing device 100 on the crown cap 300*a* of the bottle 300.

In operation 602, the user 200 inserts the notch 105 at the knurled rim 300*c* of the crown cap 300. At this operation, the second point of contact is initiated between the notch 105 of the first elongated component 101 with the knurled rim 300*c*. During the second point of contact, the knurled rim 300*c* is designed to be retained inside the indentation 105*a* (not illustrated) in order to create a grip to further remove the crown cap 300*a* from the bottle 300.

In operation 603, the user 200 retains the first elongated component 101 on the top flat surface 300*b* to initiate the first point of contact between the first elongated component 101 and the crown cap 300*a* of the bottle 300. The crown cap 300 further includes the knurled rim 300*c* and a top flat surface 300*b*. The first point of contact is between the first elongated component 101 and the top flat surface 300*b*. Operation 602 and 603 can be initiated interchangeably or simultaneously without any limitation and dependent on the user's preference to remove the crown cap 300*a* from the bottle 300.

In operation 604, the user 200 operates the second elongated component 102 by holding the second elongated component 102 to further actuate (operation 605) at the knurled rim 300*c* of the crown cap 300*a* to open the crown cap 300*a* from the bottle 300. In operation 606, the user 200 opens the bottle 300 by removing the crown cap 300*a*.

The described implementations may also include one or more of the following features. Method where the serviceable crown cap removing device further including a first connector 104 removably connecting the top end 101*a* of the first elongated component 101 to the top end 102*a* of the second elongated component 102; and a second connector 103 movably engaging the bottom end 101*b* of the first elongated component 101 with the bottom end 102*b* of the second elongated component 102; and whereas the first and the second elongated components 101, 102 are mirror-image halves and designed to form an enclosed shape.

Method where the enclosed shape can be from a group having a heart shape, a circle, a square, a diamond, a triangle, a diamond, and a polygonal shape. Method where the first connector 104 removably connects the top end 101*a* of the first elongated component 101 to the top end 102*a* of the second elongated component 102 in confronting relationship, forming an enclosed shape. Method where the second connector 103 movably engages the bottom end 101*b* of the first elongated component 101 with the bottom end 102*b* of the second elongated component 102 thereby opening and forming the enclosed shape.

Method where the first connector 104 comprises one or more selected from a group comprising a spring connector, a magnetic connector, a press fit, a hinge and pin connector, and a tactile click connector. Method where the second connector is selected from one or more of a group comprising a spring connector, a hook connector, a clasp, a clip, a buckle, a hinge and pin connector, a hoop, and a hasp. Method where the enclosed shape is configured to define a solid jewelry piece, a keychain piece, a hair accessory, and a finger stand. Method where the first element 105 is configured to be angularly situated with the inner perimeter 101 *c* of the first elongated component 101, thereby forming an indentation 105 *a*. Method where the first and the second elongated components 101,102 are of a shape including but not limited to a half heart-shaped, a half loop, a half square, a half triangle, a half polygonal, and a half diamond, where the first and second elongated components 101,102 are mirror-image halves.

In one general aspect, the serviceable crown cap-removing device 100 wherein the enclosed shape is configured to be used as a solid jewelry piece, a keychain piece, a hair accessory, and a finger stand. The serviceable crown cap-removing device 100 is designed to be easy to carry by the user 200 due to its serviceable nature with secondary utilities like a solid jewelry piece, a keychain piece, a hair accessory, and a finger stand. It is contemplated that the serviceable crown cap-removing device 100 described herein can be used in various roles; hence, the size of the device 100 and the resulting enclosed area of the inner perimeter of the first and second elongated components 101,102 are according to various embodiments is highly variable.

In the foregoing specification, specific embodiments have been described. However, one of the ordinary skills in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims, including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the description. This method is not to be interpreted as reflecting an intention that the claimed embodiments require more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

I claim:

1. A dual purpose crown cap-removing and jewelry device comprising:
- a first elongated component including:
  - a top-end,
  - a bottom end,
  - an inner perimeter, and
  - an outer perimeter;
- a second elongated component including:
  - a top-end,
  - a bottom end,
  - an inner perimeter, and
  - an outer perimeter;
- a first element mechanically attached at the bottom end of the first elongated component to form an indentation, configured to be inserted at a knurled rim of a crown cap of a bottle and angularly situated with the inner perimeter of the first elongated component;
- a first connector removably connecting the top end of the first elongated component to the top end of the second elongated component;
- a second connector movably engaging the bottom end of the first elongated component and the first element with the bottom end of the second elongated component; and
- whereas the first and the second elongated components are mirror-image halves configured to form an enclosed shape for wearing as a piece of jewelry and an open shape for removing the crown cap of the bottle.

2. The device of claim 1, wherein the first and the second elongated components are of a shape including but not limited to a half heart-shaped, a half loop, a half square, a half triangle, a half polygonal and a half diamond, wherein the first and second elongated components are mirror-image halves.

3. The device of claim 1, wherein the enclosed shape comprises one or more selected from a group consisting of a heart shape, a circle, a square, a diamond, a triangle, a diamond, and a polygonal shape.

4. The device of claim 1, wherein the first connector removably connects the top end of the first elongated component to the top end of the second elongated component in a confronting relationship, thereby forming the enclosed shape.

5. The device of claim 1, wherein the second connector mechanically engages the bottom end of the first elongated component with the bottom end of the second elongated component thereby forming the enclosed and open shape.

6. The device of claim 1, wherein the first connector is selected from one or more of a group consisting of a spring connector, a magnetic connector, a press fit, a hinge and pin connector, and a tactile click connector.

7. The device of claim 1, wherein the second connector is selected from one or more of a group consisting of a spring connector, a hook connector, a clasp, a clip, a buckle, a hinge, and pin connector, a hoop and a hasp.

8. The device of claim 1, wherein the enclosed shape is configured to be used as at least one of a solid jewelry piece, a keychain piece, a hair accessory, and a finger stand.

9. The device of claim 1, wherein the first and the second elongated components are constructed from a plastic, a metal and an alloy material.

10. A method for using a dual purpose crown cap removing device to remove a crown cap from a bottle and to wear as a piece of jewelry, the method comprising:

disconnecting a first connector to open a first elongated component and a second elongated component of the device;

placing a top end of the first elongated component of the device on the crown cap of the bottle;

inserting a first element of the first elongated component on a knurled rim of the crown cap;

holding the second elongated component of the device;

actuating the knurled rim of the crown cap;

removing the crown cap from the bottle;

opening the bottle; and connecting the first connector to enclose the first elongated component and the second elongated component of the device to wear as the piece of jewelry;

wherein the first element is mechanically attached at a bottom end of the first elongated component to form an indentation and configured to be angularly situated with an inner perimeter of the first elongated component.

11. The method of claim 10, wherein the method further including:

retaining the knurled rim of the crown cap inside the first element of the first elongated component, wherein the first elongated component further includes an outer perimeter;

holding the second elongated component of the device, where the second elongated component further includes a top-end, a bottom-end, an inner perimeter, and an outer perimeter to facilitate the opening of the device;

connecting the first connector by connecting the top end of the first elongated component to the top end of the second elongated component; and movably engaging the bottom end of the first elongated component and the first element with the bottom end of the second elongated component using a second connector;

wherein the first and the second connectors are configured to facilitate an enclosed and open shape of the device; and wherein the first and the second elongated components are mirror-image halves configured to form the enclosed shape for wearing as the piece of jewelry and the open shape for removing the crown cap of the bottle.

12. The method of claim 10, wherein the first and the second elongated components are of a shape including but not limited to a half heart-shaped, a half loop, a half square, a half triangle, a half polygonal and a half diamond, wherein the first and second elongated components are mirror-image halves.

13. The method of claim 10, wherein the enclosed shape comprises one or more selected from a group consisting of a heart shape, a circle, a square, a diamond, a triangle, a diamond, and a polygonal shape.

14. The method of claim 10, wherein the first connector removably connects the top end of the first elongated component to the top end of the second elongated component in a confronting relationship, thereby forming the enclosed shape.

15. The method of claim 10, wherein the second connector movably engages the bottom end of the first elongated component with the bottom end of the second elongated component thereby forming the enclosed and open shape.

16. The method of claim 10, wherein the first connector is selected from one or more of a group consisting of a spring connector, a magnetic connector, a press fit, a hinge and pin connector, and a tactile click connector.

17. The method of claim 10, wherein the second connector is selected from one or more of a group consisting of a spring connector, a hook connector, a clasp, a clip, a buckle, a hinge and pin connector, a hoop, and a hasp.

18. The method of claim 10, wherein the enclosed shape is configured to be used as at least one of a solid jewelry piece, a keychain piece, a hair accessory, and a finger stand.

* * * * *